United States Patent [19]

Okuyama et al.

[11] 4,132,931
[45] Jan. 2, 1979

[54] CONTROL SYSTEM FOR A.C. MOTORS

[75] Inventors: Toshiaki Okuyama; Yuzuru Kubota; Hiroshi Nagase, all of Hitachi, Japan

[73] Assignee: Hitachi, Ltd., Japan

[21] Appl. No.: 829,000

[22] Filed: Aug. 30, 1977

[30] Foreign Application Priority Data

Sep. 3, 1976 [JP] Japan .................................. 51-104867

[51] Int. Cl.² .............................................. H02P 7/46
[52] U.S. Cl. .................................. 318/732; 318/700; 318/799; 318/809; 318/766
[58] Field of Search ............... 318/187, 197, 215, 227, 318/230, 231, 237

[56] References Cited

U.S. PATENT DOCUMENTS

| 3,611,082 | 10/1971 | Schmitz ........................... 318/197 X |
| 3,657,622 | 4/1972 | Reuland et al. ....................... 318/237 |
| 4,039,909 | 8/1977 | Baker .............................. 318/187 X |

Primary Examiner—Gene Z. Rubinson
Attorney, Agent, or Firm—Craig & Antonelli

[57] ABSTRACT

A control system for an a.c. motor having a polyphase primary winding (stator winding) and a corresponding polyphase secondary winding. The primary and the secondary windings are supplied with current from different frequency converters provided separately for each of the windings. The alternating currents flowing through the primary and the secondary windings are in opposite phase with each other. A position detector is provided for detecting the position of rotor of the a.c. motor. The magnitude of the primary current is controlled proportionally to a current reference signal in dependence on deviation of a speed feed-back signal from a speed reference signal, while the magnitude of the secondary current is controlled to a constant value. The phases of the primary and the secondary currents are controlled on the basis of the rotor position. The excitation frequencies for the primary and the secondary windings are set at a predetermined ratio between certain integers and a sum of these excitation frequencies is set to be equal to an angular frequency of rotating electrical angle of rotor.

6 Claims, 12 Drawing Figures

CONTROL SYSTEM FOR A.C. MOTORS

BACKGROUND OF THE INVENTION

1. Field of the Invention

The present invention relates in general to a control apparatus for an a.c. motor driven through frequency converters and in particular to a control system which allows the a.c. motor to be operated at a high speed even when the upper limit of the output frequency from the frequency converter is set at a low value.

2. Description of the Prior Art

As is well known in the art, the a.c. motor driven through the frequency converter composed of thyristors is a motor capable of being driven at variable speeds and having no commutator to make the maintenance therefor to be facilitated. This type of motor is often referred to as the commutatorless motor.

It is also well known that the rotational speed of such commutatorless motor depends on the output frequency of the frequency converter, as can be expressed by the following equation:

$$N = 120 f/p \tag{1}$$

where
- N: rotational speed of motor
- f: output frequency of the frequency converter, and
- p: number of poles of motor.

On the other hand, an upper limit is imposed on the output frequency of the frequency converter. In particular, the upper limit of the output frequency is relatively low in the case of a frequency converter in which commutations of thyristors constituting the converter are effected by utilizing an a.c. source voltage. For example, in a cyclo converter which is supplied with power from an a.c. power source of a commercial frequency to control firing angle of the thyristors for producing a sine wave voltage having a variable frequency, the upper limit of the output frequency is usually on the order of one third of the a.c. source frequency. The permissible highest speed of the motor is restricted by the above equation (1). The motor can not be driven at a high speed exceeding the permissible limit, even when load apparatus requires the high speed.

Attempts to solve the above problem have been already proposed. For example, in the article "Cyclo converter Control of the Doubly Fed Induction Motor" by WILLIS F. LONG published in "THE INSTITUTE OF ELECTRICAL AND ELECTRONICS ENGINEERS", VOL. IGA-7, No. 1 (1971), pp. 95-100, there is disclosed an induction motor control system in which the primary and the secondary windings of the motor are connected in series is opposite phase relation relative to each other and excited by a common cyclo converter, thereby to attain the rotational frequency as twice as higher than the frequency of the exciting current. However, the induction motor exhibits the series winding motor characteristics which are disadvantageous in certain application.

For example, it may be contemplated that the commutatorless motor is to be used for driving a rolling mill for steel materials. In such case, the shunt motor characteristic is required for the driving motor, since the series winding motor characteristic is incompatible with load characteristic.

Furthermore, a large capacity is required for the slip ring which serves to connect the primary and the secondary windings to each other. In other words, electric power supplied to the primary winding and the secondary winding is determined by the excitation frequency. Thus, in the case of the induction motor disclosed in the above literature, electric power supplied to the secondary winding is a half of the rated capacity of the motor. As the capacity of the motor is increased, the capacity of the slip ring is also correspondingly increased. At present, it is considered that the upper limit of the slip ring capacity should be on the order of 1000 KW from the economical viewpoint. Consequently, the motor of a large capacity is usually regarded impracticable.

SUMMARY OF THE INVENTION

An object of the invention is to provide a control system for an a.c. motor which allows the motor to have the shunt characteristic and permits the use of a slip ring of a relatively small capacity.

According to one aspect of the invention, the primary winding and the secondary winding of an a.c. motor are excited in opposite phase relation through respective frequency converters separately provided for each of the primary and the secondary windings. The frequencies of the primary and the secondary excitation currents are set at a predetermined ratio relative to each other.

BRIEF DESCRIPTION OF THE DRAWINGS

FIG. 5 illustrates operation of the system shown in FIG. 4.

FIG. 6a shows a circuit diagram of a position signal processing circuit which may be employed in the motor control system according to the invention.

FIG. 6b illustrates operation of the circuit shown in FIG. 6a.

FIG. 8 is a schematic circuit diagram showing a frequency setting circuit which can be employed in the motor control system shown in FIG. 7.

FIG. 9 illustrates operation of the control system shown in FIG. 7.

DETAILED DESCRIPTION OF THE PREFERRED EMBODIMENTS

Figure 1:
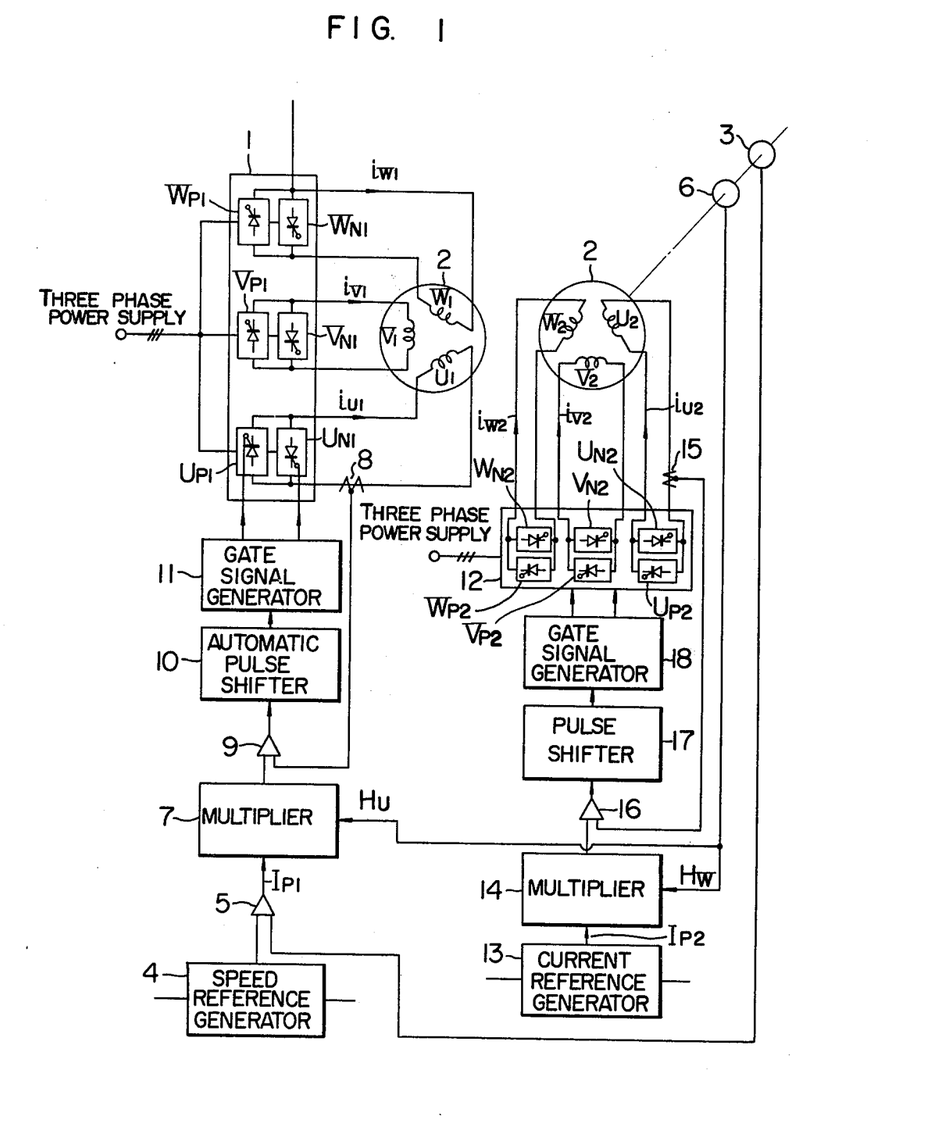
FIG. 1 is a schematic circuit diagram showing an arrangement of a motor control system according to an embodiment of the invention.

FIG. 1 shows in a schematic circuit diagram a general arrangement of a control apparatus for an a.c. electric motor constructed in accordance with the teachings of the invention. In the following description of the embodiment illustrated in this figure, it is assumed that a cyclo converter which is adapted to generate a sine wave voltage is employed as a frequency converter, although other various types of frequency converters may be used in carrying out the invention.

Referring to FIG. 1, reference numeral 1 denotes the cyclo converter (hereinafter referred to also as CYC in an abridged form) which is connected to an a.c. supply source to convert a commercial a.c. power into three phase alternating current having a variable frequency. To this end, the cyclo converter 1 comprises three pairs of thyristor bridges $U_P$, $U_N$, $V_P$, $V_N$ and $W_P$, $W_N$ in a Gratz's circuit configuration, with each pair of thyristors connected in anti-parallel to each other. Reference numeral 2 denotes an induction motor having three-phase primary windings $U_1$, $V_1$ and $W_1$ (stator windings) and three-phase secondary windings $U_2$, $V_2$ and $W_2$ (rotor windings). Numeral 3 denotes an actual speed signal generator for detecting actual rotation speed of the induction motor 2, while 4 denotes a speed reference (or desired speed) signal generator circuit. The output signals from the speed reference signal generator 4 and the actual speed signal generator 3 are input to a speed derivation amplifier (or differential amplifier) circuit 5 which is adapted to compare these two speed signals with each other thereby to produce an amplified deviation of the actual speed signal for the reference or desired speed signal. Reference numeral 6 designates a position detector adapted for producing three-phase sine wave signals which are out-of-phase by 120° with one another in response to a predetermined rotational angular position of a rotating shaft of the induction motor 2. The shaft position detector 6 may be composed of permanent magnets fixedly attached to the rotor of the induction motor and three Hall generator elements disposed on the stator in opposition to the permanent magnets. One of the output signals from the shaft position detector 6 is applied to a multiplier 7 to be multiplied with the output signal from the speed deviation amplifier signal, thereby to produce a current reference signal of a sine waveform utilized for controlling the U-phase output current from cyclo converter or CYC 1. The output current from the thyristor circuit ($U_p$; $U_n$) constituting U-phase of the cyclo converter 1 is in turn detected by a current detector 8, the output signal from which is then applied to an operational amplifier 9 together with the current reference signal from the multiplier 7 to be compared with the former. The output signal from the differential amplifier circuit 9 which thus represents an amplified deviation of the output signal from the current detector 8 relative to the current reference signal is applied to an automatic pulse shifter 10 which is adapted to control firing phase or angle for the thyristor circuit ($U_{P1}$, $U_{N1}$). Reference numeral 11 denotes a gate signal generator circuit for producing alternatively gate signals to the thyristor $U_{P1}$ or $U_{N1}$ in dependence upon the direction of output current from these thyristors. In FIG. 1, there is shown only the control circuit arrangement for the thyristor circuit of U-phase. However, it will be appreciated that similar control circuits are provided for other thyristor circuits of W and V phase, respectively, although they are omitted from FIG. 1 for the clarity's sake of illustration.

Reference numeral 12 designates another cyclo converter having a substantially same construction as the CYC 1 and supplies to the secondary windings $U_2$, $V_2$, $W_2$ three-phase current having a variable frequency. A secondary current reference signal generator circuit 13 commands the magnitude of each secondary current flowing through the secondary winding $U_2$, $V_2$ and $W_2$, respectively. One of the output signals from the above described position detector 6 is multiplied by the output signal from the secondary current reference circuit at a multiplier 14 to produce a current reference signal of a sine waveform for controlling the output current of U-phase of the cyclo converter 12. The current reference signal from the multiplier 14 and the output signal from a current detector 15 are compared with each other through a differential current amplifier 16 which produces an amplified deviation of the signal from the current detector 15 in respect to the current reference signal. An automatic pulse shifter circuit 17 controls the firing phase or angle for the thyristor circuit ($U_{P2}$, $U_{N2}$) of CYC 12 in dependence upon the output signal from the differential current amplifier 16. Finally, reference numeral 18 denotes a gate signal output circuit for supplying a gate signal to the thyristor circuit for U-phase of the cyclo-converter 12. In the drawing, the control circuitry of the above arrangement is again shown only for the U-phase of the cyclo converter 12 for the clarity of the illustration. It will be self-explanatory that substantially same control circuits are provided for the other phases (V and W-phases) of the cycl-converter 12. Description of these control circuitries will be unnecessary.

Next, operation of the apparatus shown in FIG. 1 will be described.

As described hereinbefore, the position detector 6 is composed of the permanent magnets attached to the rotating shaft of the induction motor 2 and Hall generator elements secured to the stator for sensing the magnetic fields produced by the permanent magnets, thereby to produce signals in dependence upon the intensity of magnetic field. The permanent magnets are arranged on the rotor in such a manner that N and S poles are alternatively disposed in a number equal to the pole number of the induction motor 2. On the other hand, the Hall generator elements are mounted on the stator as spaced from one another by 120° in terms of electrical angle. Thus, the position detector 6 is capable of producing three-phase position signals of a sine waveform $H_U$, $H_V$ and $H_W$ each having a same and constant amplitude in dependence of the rotation angle of the rotor shaft of the induction motor 2. These position signal may be mathmatically expressed as follows.

$$H_U = \sin(\omega_H t + \phi) \quad (2)$$

$$H_V = \sin(\omega_H t + \phi - 120°) \quad (3)$$

$$H_W = \sin(\omega_H t + \phi + 120°) \quad (4)$$

wherein $\omega_H$: angular frequency of the position signal, and $\phi$: initial phase of the signal at the time point $t = 0$.

Since the amplitude values of above signals are constant, description thereof will be unnecessary.

The multiplier 7 operates to multiply the output signal $H_U$ from the position detector with the output signal (hereinafter referred to also as current reference signal $I_p$) from the speed deviation amplifier circuit 5, thereby to output a current pattern signal which is in phase with the position signal $H_U$ and has an amplitude proportional to the output signal from the amplifier circuit 5. The current pattern signal is compared with the output current from the current detector 8 through the current deviation amplifier (or differential current amplifier) 9, the resulting deviation signal being applied to the automatic pulse shifter 10. The automatic pulse shifter 10 in turn responds to the deviation signal to control the firing phase or angle of the thyristor circuit ($U_{P1}$, $U_{N1}$) and apply the gate signal to the thyristor $U_{P1}$ or $U_{N1}$ through the gate signal generator circuit 11. In this manner, the circuits 8 to 11 cooperate with one another to perform the firing control of the thyristor circuit ($U_{P1}$, $U_{N1}$). Since such firing control is effected in a similar manner as a well known static Leonard system which is capable of controlling current in both forward and backward directions, detailed description on the firing control will be unnecessary. In any case, the primary current $i_{U1}$ is controlled to a value in accordance with the current pattern signal. In other words, the primary current $i_{U1}$ is so controlled as to have a value proportional to the current reference signal $I_{P1}$ output from the speed deviation amplifier circuit 5 and to be in phase with the position signal $H_U$.

Same control operations are effected for the other thyristor pairs $V_{P1}$; $V_{N1}$ and $W_{P1}$; $W_{N1}$. Consequently, the primary currents $i_{V1}$ and $i_{W1}$ for the V- and W-phases, respectively, will be controlled in a similar manner as the primary current $i_{U1}$ for the U-phase except that the currents $i_{V1}$ and $i_{W1}$ are in phase with the position signals $H_V$ and $H_W$, respectively.

Thus, the primary currents for every phase U, V or W may be given by the following expressions:

$$i_{U1} = I_{m1} \sin(\omega_H t + \phi) \tag{5}$$

$$i_{V1} = I_{m1} \sin(\omega_H t + \phi - 120°) \tag{6}$$

$$i_{W1} = I_{m1} \sin(\omega_H t + \phi + 120°) \tag{7}$$

wherein $I_{m1}$ represents amplitude of the stator or primary current proportional to the signal $I_{P1}$.

The multiplier 14 serves to multiply the position signal $H_W$ output from the position detector 6 with the output signal from the secondary current reference generator circuit 13 (hereinafter referred to also as current reference signal $I_{P2}$), thereby to output a current pattern signal of a sine waveform which is in phase with the position signal $H_W$ and has an amplitude proportional to that of the current reference signal $I_{P2}$. The current pattern signal is compared with the output signal from the current detector circuit 15 through the current deviation amplifier 16, the resulting deviation signal being fed to the automatic pulse shifter 17. The pulse shifter 17 responds to the deviation signal to control the firing phase or angle for the thyristor pair $U_{P2}$ and $U_{N2}$ and apply the gate signal to the thyristors $U_{P2}$ or $U_{N2}$ through the gate signal generator circuit 18. In this way, the parts 15 to 18 cooperate with one another to perform the control operation for the thyristor circuit ($U_{P2}$, $U_{N2}$) in a similar manner as is in the case of the control for the thyristor circuit ($U_{P1}$, $U_{N1}$). As a result, the secondary current $i_{U2}$ is controlled so as to have a magnitude proportional to the current reference signal $I_{P2}$ and be in phase with the position signal. Similar controls are made for the thyristor circuits $V_{P2}$; $V_{N2}$ and $W_{P2}$; $W_{N2}$ to control the secondary currents $i_{V2}$ and $i_{W2}$ in the similar manner as the primary current $i_{U2}$ except that the secondary current $i_{V2}$ and $i_{N2}$ are made to be in phase with the position signals $H_V$ and $H_W$, respectively.

In connection with the control of the secondary currents described above, it is to be noted that the position signals $H_U$, $H_V$ and $H_W$ applied to the respective multipliers 14 each provided for each phase U, V or W are in the opposite phase relation to the position signals $H_U$, $H_V$ and $H_W$ applied to the respective multipliers 14, so that the secondary currents $i_{U2}$, $i_{V2}$ and $i_{W2}$ are in phase with the primary currents $i_{W1}$, $i_{V1}$ and $i_{U1}$, respectively.

Thus, the secondary or armature currents $i_{U2}$, $i_{V2}$ and $i_{W2}$ are given by the following expressions:

$$i_{U2} = I_{m2} \sin(\omega_H t + \phi + 120°) \tag{8}$$

$$i_{V2} = I_{m2} \sin(\omega_H t + \phi - 120°) \tag{9}$$

$$i_{W2} = I_{m2} \sin(\omega_H t + \phi) \tag{10}$$

wherein $I_{m2}$ represents amplitude of the secondary or rotor current which is proportional to the signal $I_{P2}$.

The primary and secondary currents flowing through the primary (stator) and the secondary (rotor) windings of the induction motor 2 will of course produce torque to rotate the rotor thereof. This will now be described by referring to FIG. 2.

Figure 2:
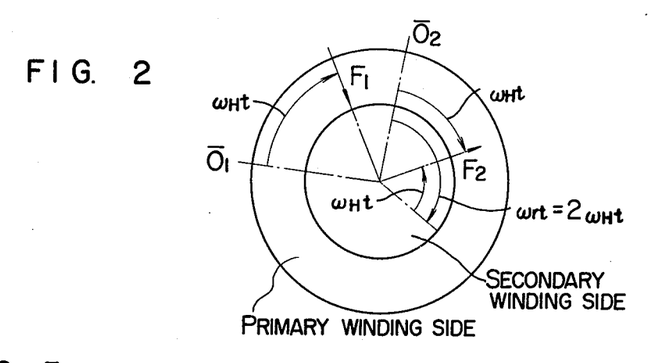
FIG. 2 illustrates operation of the motor control system shown in FIG. 1.

In this figure, there is illustrated a relationship between a magnetomotive force $F_1$ of the primary winding and the magnetomotive force $F_2$ of the secondary winding of the induction motor 2. Since both the primary and the secondary windings are excited by three-phase alternating current of sine waveform, the magnetomotive forces $F_1$ and $F_2$ will produce circular magnetic fields which are revolved at speeds equal to each other.

It is assumed now that the magnetomotive force $F_1$ is located at $\overline{O}_1$ with $F_2$ at $\overline{O}_2$ at the initial time point $t = 0$. The rotor will then begin to rotate in the clockwise direction under the influence of torque generated by the electromagnetic force due to $F_1$ and $F_2$. After the time elapse of t seconds, the magnetomotive force $F_1$ has advanced for an electrical angle corresponding to $\omega_H t$, while the rotor has advanced for an electrical angle of $\omega_r t$ represents an angular frequency, as can be seen from FIG. 2. Because the secondary winding is excited in the opposite phase, $F_2$ has revolved for an electrical angle represented by ($\omega_r t - \omega_H t$). It is assumed that the angular frequency $\omega_H$ is set to a half ($\frac{1}{2}$) of $\omega_r$. In the case of a four-pole machine, such setting can be accomplished by using the position detector which is adapted to produce one cycle of signal for one revolution of the four-pole induction motor. On the other hand, when the induction motor 2 is a two-pole machine, the position detector which is capable of a half cycle of signal for one revolution of the machine can be used. In the latter case, the position detector can be realized with a number of magnetic poles corresponding to a half of the pole number of the induction number. Alternatively, a suitable transmission means such as gear train or belt drive having a reduction ratio (integer ratio) may be employed to connect the motor to the position detector apparatus.

When the angular frequencies $\omega_H$ and $\omega_r$ are set as described above, the advance of the magnetomotive for $F_2$ can be given by $$\omega_r t - \omega_H t = \omega_H t \tag{11}$$

since $\omega_H = \frac{1}{2}\omega_r$.

In this manner, even after elapse of $\pm$ seconds, the phase relation between the magnetomotive forces $F_1$ and $F_2$ will remain same as the one prevailing at the starting time point, i.e. when t is equal to zero, with the result that the rotor will continue to rotate under torque produced by the electromagnetic force.

Now, consideration will be made to the relationship between the output angular frequencies $\omega_H$ of the cyclo converters 1 and 12 and the angular velocity of rotation $\omega r/p$ wherein p represents the number of pole pairs. It will be understood that the speed of rotation becomes equal to ωH/p when the primary and secondary windings are excited in phase with each other, while upon excitation in opposite phase, the speed of rotation will become equal to 2ωH/p, since $\omega_r = 2\omega_H$. This means that the rotating speed of the induction motor can be increased as twice as high when compared with a hitherto known system, even when the upper limit of the output frequency from the frequency converter or cyclo converter remains same.

Torque produced in the motor can be mathmatically expressed as follows:

$$\tau = -P(3/2)^2 M I_{m1} I_{m2} \sin(2\phi - \theta + 120°) \quad (12)$$

where

P: number of pole pairs,

M: maximum value of mutual inductance between primary and secondary windings, and θ: electrical angle between phases $U_1$ and $U_2$ of the primary and the secondary winding at time point $t = 0$.

As can be seen from the expression (12), torque τ is a function of the amplitudes $I_{m1}$ and $I_{m2}$ of the primary and secondary currents and an angle $(2\phi - \theta)$. The angle $(2\phi - \theta)$ can be arbitrarily set by adjusting the phase of the output signal output from the position detector 6. For example, if the coupling relation between the position detector 6 and the motor 2 is adjusted so that the output signal $H_U$ from the position detector 6 becomes at a positive maximum value when $2\phi - \theta = 150°$ and hence $\theta = 30°$, torque will become also maximum and can be given by the following expression:

$$\tau = p(3/2)^2 I_{m1} I_{m2} M \quad (13)$$

In this connection, the magnitude of the secondary current $I_{m2}$ can be set at a constant value determined by the secondary current reference signal generator circuit 13. Thus, torque is eventually made to be proportional to the magnitude $I_{m1}$ of the primary currents, as a result of which the shunt characteristic can be obtained.

Next, principle on which torque is generated will be briefly described.

Figure 3A:
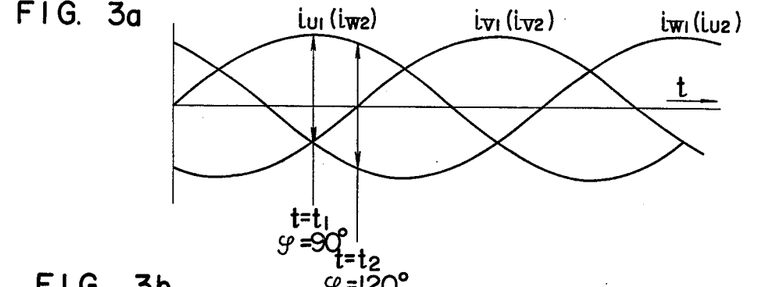
FIGS. 3a to 3c illustrate principle of torque generation in an induction motor controlled according to the teachings of the invention.

FIG. 3a illustrates waveforms of the primary currents $i_{U1}$, $i_{V1}$ and $i_{W1}$. As described hereinbefore, the primary current is controlled so as to be proportional to the position signal output from the position detector 6 and takes three phase sine waveforms as shown in FIG. 3a.

Figure 3B:
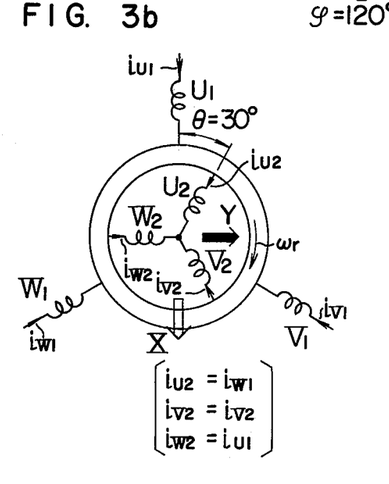

FIG. 3b illustrates relationship between the primary winding (stator winding) and the secondary winding (rotor winding) of the inductor motor 2 at the time point when $t = t_1$ and $\theta = 30°$. When adjustment is made such that $2\phi - \theta = 150°$, the phase φ of the primary current at that time point $t_1$ will become equal to 90°. Magnitudes of the three phase primary currents $i_{U1}$, $i_{V1}$ and $i_{W1}$ at the time point $t_1$ are indicated by vertical line segments attached with arrows. Further, at this time point $t_1$, the magnetomotive force $F_1$ of the primary winding is of the direction indicated by a blank arrow X shown in FIG. 3b, while the magnetomotive force $F_2$ of the secondary winding is of the direction indicated by a solid arrow Y. Due to such orthogonal orientation of the two magnetomotive forces $F_1$ and $F_2$, torque is produced and caused to revolve in the direction indicated by $\omega_r$.

Figure 3C:
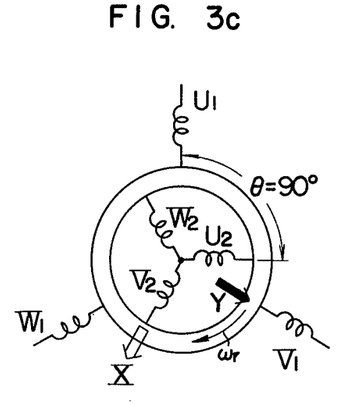

At a succeeding time point $t_2$ at which θ becomes equal to 90°, the phase φ becomes equal to 120° with both the magnetomotive forces $F_1$ and $F_2$ intersecting orthogonally to each other as indicated by the arrows to generate torque. In the above discussion, torque generation is examined at two time points. It will however be noted that same conditions will apply valid at any given time points.

In the control operation described in the foregoing, the rotating speed of the induction motor 2 can be controlled to a value compatible with the speed reference signal, since the magnitude of the primary current $I_{m1}$ is controlled in accordance with the current reference signal output from the speed deviation amplifier 5. Furthermore, because the motor is imparted with the shunt characteristic as will be seen from the expression (13), the induction motor may be advantageously used for driving a rolling mill for steel. In the case of the embodiment shown in FIG. 1, the rotating speed of the motor can be increased as twice as high when compared with the hitherto known control systems, even when the upper limit of output frequency from the frequency converter remains same. Besides, the induction motor can be operated in a stable manner without being subjected to any disturbance or detuning, because the primary and secondary currents are controlled by the output signal from the common position detector.

In the foregoing description, it has been assumed that the excitation frequency of the primary and the secondary windings are equal to each other. However, it should be appreciated that different excitation frequencies may be used for the primary and the secondary windings. In general, similar characteristics can be obtained so far as the following condition is satisfied, namely:

$$\omega_1 + \omega_2 = \omega_r \quad (14)$$

wherein $\omega_1$: angular frequency of the primary current, $\omega_2$: angular frequency of the secondary current, and $\omega_r$: revolution frequency of electrical angle.

Furthermore, when control is made such that $\omega_1 > \omega_2$ in addition to the satisfaction of the condition (14), the electric power to be supplied to the secondary winding (or rotor winding) can be decreased as compared with the case where $\omega_1 = \omega_2$. For a motor having a large capacity, electric energy to be supplied to the secondary winding is of course increased. In this connection, a problem lies in the fact that the capacity of the slip ring has to be correspondingly increased, involving an increased dimension of the electric motor. In an attempt to evade from such disadvantages, these arises often the necessity for such means to allow the electric power supplied to the secondary winding to be reduced.

In view of the standpoint mentioned above, another embodiment of the invention will be described by referring to FIG. 4 in which control is to be made in accordance with relationships such that $\omega_1 = \frac{2}{3}\omega_r$ and $\omega_2 = \frac{1}{3}\omega_r$.

Figure 4:
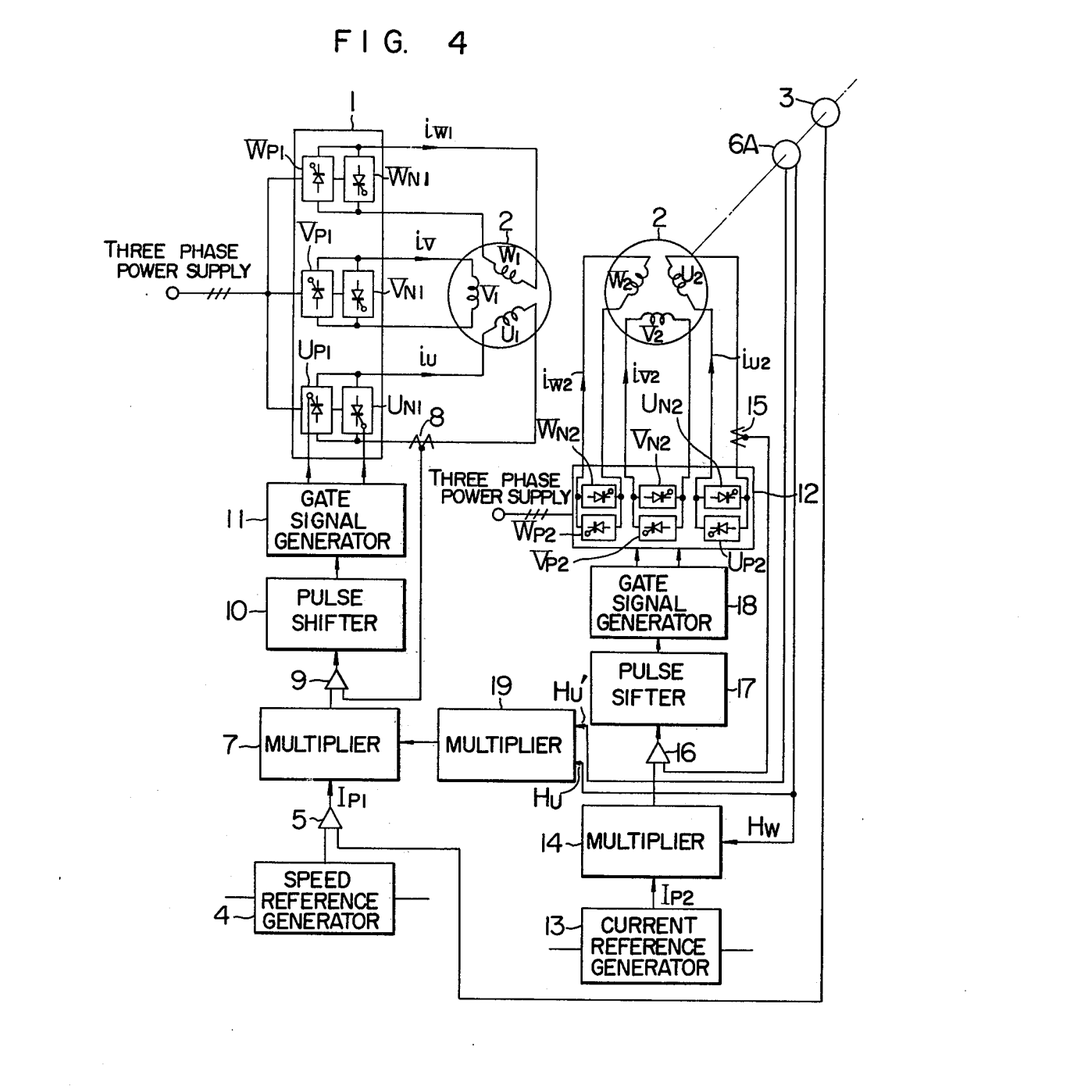
FIG. 4 is a similar view to FIG. 1 and shows another embodiment of the motor control system according to the invention.

In FIG. 4, parts or elements denoted by the same reference numerals as those shown in FIG. 1 are same or equivalent as or to the latter. Accordingly, repetition of these parts will be unnecessary except for the position detector 6A which is, in the case of this embodiment, adapted to produce the position signals $H_U$, $H_V$ and $H_W$ each of a sine waveform and having an angular frequency equal to one third (⅓) of the angular frequency $\omega_r$ of the rotating electrical angle and additionally produce these phase position signals each leading for 90° relative to the position signals $H_U$, $H_V$ and $H_W$. Reference numeral 19 denotes a multiplier for processing the signals from the position detector 6A in a manner described hereinafter. It will be appreciated that similar circuit arrangements are provided for the V- and U-phases, although they are not shown in the drawing for the clarity of illustration.

Referring to FIG. 4, the position detector 6A is adapted to produce two groups of three phase sine wave signals $H_U$; $H_V$; $H_W$ and $H_U'$; $H_V'$; $H_W'$ as follows:

$$H_U = \sin(\omega_H t + \phi) \tag{15}$$

$$H_V = \sin(\omega_H t + \phi - 120°) \tag{16}$$

$$H_W = \sin(\omega_H t + \phi + 120°) \tag{17}$$

$$H_U' = \cos(\omega_H t + \phi) \tag{18}$$

$$H_V' = \cos(\omega_H t + \phi - 120°) \tag{19}$$

$$H_W' = \cos(\omega_H t + \phi + 120°) \tag{20}$$

wherein $\omega_H = \frac{1}{3}\omega_r$.

The multiplier 19 serves to multiply the signals $H_U$ and $H_U'$ with each other to output a signal represented by the following expression:

$$J_U = H_U \cdot H_U' \propto \sin(2\omega_H t + 2\phi) \tag{21}$$

For the signals $H_V$; $H_V'$ as well as $H_W$; $H_W'$, following multiplications are made:

$$J_V = H_V \cdot H_V' \propto \sin(2\omega_H t + 2\phi - 120°) \tag{22}$$

$$J_W = H_W \cdot H_W' \propto (2\omega_H t + 2\phi + 120°) \tag{23}$$

The signal $J_U$ is multiplied with the output signal from the speed deviation amplifier 5 through the multiplier 7 to produce a current pattern signal. The primary current of the motor 2 is so controlled as to be proportional to this current pattern signal as in the case of the embodiment shown in FIG. 1. Thus, the primary currents $i_{U1}$, $i_{V1}$ and $i_{W1}$ of every phase can be expressed by following equations:

$$i_{U1} = I_{m1}\sin(2\omega_H t + 2\phi) \tag{24}$$

$$i_{V1} = I_{m1}\sin(2\omega_H t + \phi - 120°) \tag{25}$$

$$i_{W1} = I_{m1}\sin(2\omega H t + \phi + 120°) \tag{26}$$

On the other hand, the secondary current is controlled in accordance with the current pattern signal resulted from the multiplication of the position signal $H_W$ and the output signal $I_{P2}$ of the secondary current reference signal generator circuit 13 through the multiplier 14, as is in the case of the embodiment described hereinbefore in conjunction with FIGS. 1 to 3. Accordingly, the secondary currents $i_{U2}$, $i_{V2}$ and $i_{W2}$ for every phase can be given by the expressions (8), (9) and (10), respectively, described hereinbefore.

Figures 5, 6A, 6B, 8, 9:
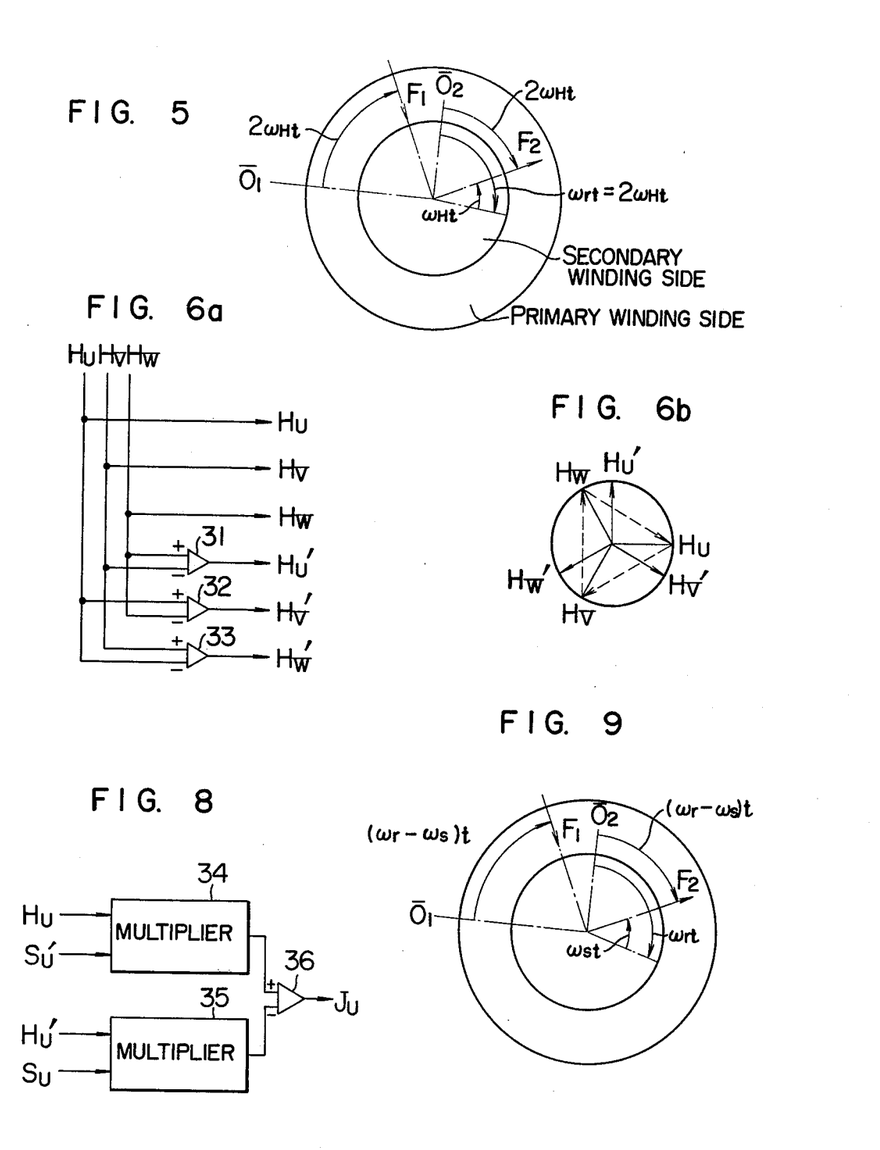

In FIG. 5, there is illustrated relationship between the magnetomotive force $F_1$ of the primary winding and the magnetomotive force $F_2$ of the secondary winding, as produced under excitation.

Since both of the primary and secondary windings are excited by the three phase since wave current, the magnetomotive forces $F_1$ and $F_2$ produce circular magnetic fields which are revolved at speeds equal to each other, as is in the case of the preceding embodiment. It is assumed that the magnetomotive force $F_1$ is at the position $\overline{O}_1$ at the time point $t = 0$ with the force $F_2$ positioned $\overline{O}_2$ in FIG. 5. Under these conditions, the rotor (secondary winding) will be rotated in the clockwise direction under torque produced by the electromagnetic forces due to the magnetomotive forces $F_1$ and $F_2$. After the time elapse of t seconds, the magnetomotive force $F_1$ has advanced for $2\omega_H t$ in terms of the electrical angle, as shown in FIG. 5. The rotor has advanced for an electrical angle of $2\omega_H t$. The magnetomotive force $F_2$ has advanced for $(\omega_r t - \omega_H t)$, since the secondary winding is excited in the opposite phase relative to the primary winding. In this connection, it should be recalled that the angular frequency $\omega_H$ is set to be one third ($\frac{1}{3}$) of $\omega_r$. Thus, the electrical angle for which the magnetomotive force $F_2$ has advanced can be rewritten as follows:

$$\omega_r t - \omega_H t = 2\omega_H t \tag{27}$$

It will be thus apparent that the relationship between the magnetomotive forces $F_1$ and $F_2$ will remain same as it was at the time point $t = 0$. The rotor continues to rotate under torque produced by the electromagnetic forces.

Examination on the relationship between the angular frequency $\omega_1$ of the primary excitation current and the angular velocity of rotation $\omega_r/P$ will prove that the angular velocity of rotation can be given by $1.5\ \omega_1/p$. In other words, according to the control system shown in FIG. 4, the rotating speed of the motor can be increased as 1.5 times as higher than the one attainable in the hitherto known control system, even when the upper limit of the output frequency from the frequency converter remain same.

Torque $\tau$ produced in the motor under the above described condition can be given by the following expression:

$$\tau = -p\,(3/2)^2\,M\,I_{m1}\,I_{m2}\sin(3\phi - \theta + 120°) \tag{28}$$

Thus, when the position detector 6 is adjusted such that $(3\phi - \theta)$ becomes equal to 150°, maximum torque can be generated, as will be seen from the expression (13).

It will be now appreciated that the control system shown in FIG. 4 is capable of controlling the motor 2 in substantially same manner as the control system shown in FIG. 1.

In the motor 2, electric power input to the primary and the secondary windings are of course transformed into mechanical force output. In this connection, it will be noted that the ratio between the input powers to the primary and the secondary windings is proportional to the ratio between the frequencies $\omega_1$ and $\omega_2$ of the excitation currents fed to these windings. In the case of the embodiment shown in FIG. 4, two thirds of total motor power is fed to the primary winding and one third is supplied to the secondary winding. This means that the secondary input power can be decreased, as a result of which the capacity of the slip ring through which the current is fed to the secondary winding may be reduced.

In the control system described above in conjunction with FIGS. 4 and 5, it has been assumed that the position detector 6A as employed is adapted to produce the position signals $H_U$, $H_V$ and $H_W$ and additionally the position signals $H_U'$, $H_V'$ and $H_W'$ which are out-of-phase for 90° relative to $H_U$, $H_V$ and $H_W$, respectively. However, it is also possible to obtain the position signals $H_U'$, $H_V'$ and $H_W'$ by using an operational circuit in a simple manner.

An example of such operational circuit is shown in FIG. 6a. Reference numerals 31, 32 and 33 denote subtraction circuits for deriving differences among the signals $H_U$, $H_V$ and $H_W$ as indicated by broken lines in the vector diagram shown in FIG. 6b. The output signals from the subtraction circuits 31, 32 and 33 are nothing elase but the additional position signals $H_U'$, $H_V'$ and $H_W'$ given by the equations (18), (19) and (20), respectively. When the operational circuit shown in FIG. 6a is used, the position detector 6A shown in FIG. 4 can be of course replaced by a position detector of a simplified construction capable of producing only the three phase signals $H_U$, $H_V$ and $H_W$.

In the control system shown in FIG. 4, the frequencies of the primary and the secondary excitation currents are controlled so as to become proportional to the rotation speed of the motor 2. However, so far as the condition expressed by the equation (14) is satisfied and that the condition $\omega_1 > \omega_2$ is met, the control of the motor speed can be accomplished in any other manner.

Figure 7:
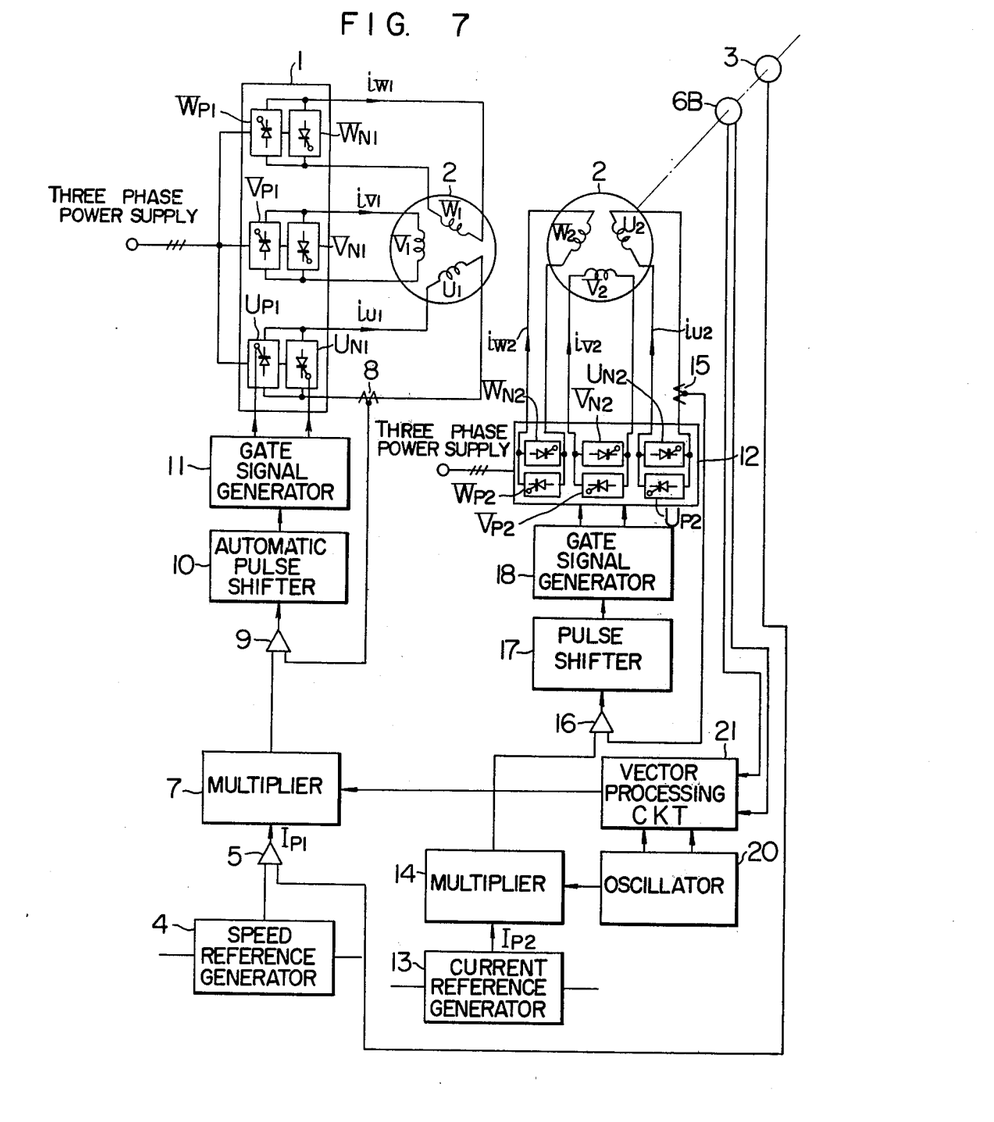
FIG. 7 is a similar view to FIG. 1 and shows still another embodiment of the motor control system according to the invention.

FIG. 7 shows a control system according to another embodiment of the invention in which the frequency of the secondary excitation current is controlled by means of an oscillator. In this figure, same reference numerals as those in FIG. 1 designate the same or equivalent parts, description of which are therefore omitted. Reference symbol 6B denotes a position detector adapted to produce sine wave signals each having a frequency of rotating electrical angle, 20 denotes an oscillator for generating three-phase sine waveform signals, and 21 denotes a vector operational circuit for deriving signals having respective frequencies corresponding to differences between the output signals from the position detector 6B and the oscillator 20.

In operation, the oscillator 20 generates two sets of three phase sine wave signals $S_U$, $S_V$, $S_W$ and $S_U'$; $S_V'$; $S_W'$ given by the following expressions:

$$S_U = \sin(\omega_s t + \delta) \tag{29}$$

$$S_V = \sin(\omega_s t + \delta - 120°) \tag{30}$$

$$S_W = \sin(\omega_s t + \delta + 120°) \tag{31}$$

$$S_U' = \cos(\omega_s t + \delta) \tag{32}$$

$$S_V' = \cos(\omega_s t + \delta - 120°) \tag{33}$$

$$S_W' = \cos(\omega_s t + \delta + 120°) \tag{34}$$

wherein $\omega_s$: angularly frequency of oscillation, and $\delta$: initial phase of the signal $S_U$ at the time point $t = 0$.

On the other hand, the position detector 6B produces two sets of three phase sine wave signals $H_U$, $H_V$, $H_W$ and $H_U'$; $H_V'$; $H_W'$ given by the following expressions:

$$H_U = \sin(\omega_r t + \phi) \tag{35}$$

$$H_V = \sin(\omega_r t + \phi - 120°) \tag{36}$$

$$H_W = \sin(\omega_r t + \phi + 120°) \tag{37}$$

$$H_U' = \cos(\omega_r t + \phi) \tag{38}$$

$$H_V' = \cos(\omega_r t + \phi - 120°) \tag{39}$$

$$H_W' = \cos(\omega_r t + \phi + 120°) \tag{40}$$

wherein $\omega_r$: angular frequency of rotating electric angle, and $\gamma$: initial phase at time $t = 0$.

The vector operational circuit 21 performs operational function on the input signals $H_U$, $H_U'$, $S_U$ and $S_U'$. As is shown in FIG. 8, the vector operational circuit is composed of multipliers 34 and 35 adapted to multiply the signal $H^U$ with $S_U'$ and the signal $H_U'$ with $S_U$, respectively, and a subtraction circuit 36 for determining difference between the output signals from the multipliers 34 and 35 thereby to output a signal $J_U$. Similar vector operational circuit is provided for each of V- and W-phases.

Output signals $J_U$, $J_V$ and $J_W$ from the vector operational circuits 21 for the respective phase can be expressed as follows:

$$J_U = H_U \cdot S_U' - H_U' \cdot S_U \propto \sin[(\omega_r - \omega_s)t + \phi - \delta] \tag{41}$$

$$J_V = H_W \cdot S_V' - H_W' \cdot S_V \propto \sin[(\omega_r - \omega_s)t + \phi - \delta - 120°] \tag{42}$$

$$J_W = H_V \cdot S_W' - H_V' \cdot S_W \propto \sin[(\omega_r - \omega_s)t + \phi - \delta + 120°] \tag{43}$$

The phases of the primary currents are controlled by the signals $J_U$, $J_V$ and $J_W$ in similar manner as in the case of the preceding embodiments. The primary currents are then given by the following expressions:

$$i_{U1} = I_{m1} \sin[(\omega_r - \omega_s)t + \phi - \delta] \tag{44}$$

$$i_{V1} = I_{m1} \sin[(\omega_r - \omega_s)t + \phi - \delta - 120°] \tag{45}$$

$$i_{W1} = I_{m1} \sin[(\omega_r - \omega_s)t + \phi - \delta + 120°] \tag{46}$$

On the other hand, the secondary currents are controlled so as to be proportional to the output signals from the oscillator 20 and given by the following expressions:

$$i_{U2} = I_{m2} \sin(\omega_s t + \delta + 120°) \tag{47}$$

$$i_{V2} = I_{m2} \sin(\omega_s t + \delta - 120°) \tag{48}$$

$$i_{W2} = I_{m2} \sin(\omega_s t + \delta) \tag{49}$$

FIG. 9 illustrates relationship between the magnetomotive force $F_1$ of the primary winding and the magnetomotive force $F_2$ of the secondary winding produced in the arrangement shown in FIG. 7. It is assumed that the forces $F_1$ and $F_2$ are at positions $\overline{O}_1$ and $\overline{O}_2$, respectively. After elapse of t seconds, the magnetomotive force $F_1$ has advanced for $(\omega_r - \omega_s)t$ in terms of thelectrical angle as shown in FIG. 9. The rotor has advanced for an electrical angle of $\omega_r t$. The force $F_2$ has advanced for $(\omega_r - \omega_s)t$ since the secondary winding is excited in the opposite phase. Thus, the relation in phase between the forces $F_1$ and $F_2$ remains same as it was at the time point $t = 0$ and torque is continuously generated.

Examination on the relation between the frequency $\omega_1$ of the primary excitation current and the angular velocity of rotation $\omega_r/p$ will prove that the angular velocity of rotation can be represented by $(\omega_1 + \omega_s)/p$ in this embodiment. In other words, even if the upper limit of the output frequency of the frequency converter remains same, the rotation speed of the motor 2 can be increased by $\omega_s$ as compared with the case of the hitherto known control system.

Since the primary and secondary input powers are proportional to $\omega_1$ and $\omega_s$, respectively, it is necessary to select $\omega_s$ so that the most effective operation can be accomplished. Although the angular frequency $\omega_s$ may be selected at a constant value, it is also possible to vary $\omega_s$ in dependence on the rotation speed of motor by using the oscillator 20 of such construction that the output frequency varies in dependence on the input signal. When the angular frequency $\omega_s$ is varied as a function of the rotation speed, the ratio between $\omega_1$ and $\omega_2$ can be constantly maintained at a constant value. On the other hand, when $\omega_s$ is set at a constant value, then the ratio $\omega_1/\omega_2$ will vary in dependence on the rotation speed of motor, since $\omega_r$ is subjected to variations.

As will be appreciated from the foregoing description, the a.c. motor is imparted with the shunt characteristic which allows the motor to be operated at a speed higher than the one determined by the upper limit of the frequency output from the frequency converter according to the teachings of the invention. Furthermore, because the excitation current frequency for the primary and the secondary windings can be set at a predetermined ratio, a slip ring of a relatively small capacity may be satisfactorily employed and thus dimension of the motor can be reduced.

In the foregoing description, the opposite phase relation between the primary and the secondary currents is accomplished with the aid of the output signal from the position detector. However, it is also possible to attain the same effect through corresponding connections between the thyristor circuits of the frequency converter and the windings of the motor.

Although the frequency converter is assumed to be composed of anti-parallel connections of paired thyristors connected in Grätz's circuitry configuration, it is self-explanatory that the invention can be implemented by using other types of frequency converters.

We claim:

1. A control system for an a.c. motor comprising:
   (a) an a.c. motor having a polyphase primary winding and a polyphase secondary winding,
   (b) position detector means for producing a position signal in dependence on rotor position of said a.c. motor,
   (c) a first frequency converter for supplying an alternating current having a variable frequency to said primary winding,
   (d) a speed control circuit for producing a current reference signal is dependence on deviation of a speed feedback signal from a speed reference signal,
   (e) a current control circuit for controlling the alternating current fed to said primary winding so that said alternating current is in phase with said position signal and has a magnitude proportional to said current reference signal;
   (f) a second frequency converter for supplying an alternating current having a variable frequency to said secondary winding,
   (g) a second current control circuit for controlling said alternating current fed to said secondary winding so that said current is in phase with said position signal and has a magnitude of a constant value,
   (h) phase sequence determining means for setting phase sequences for said primary and secondary windings in opposite phase relative to each other, and
   (i) frequency control means for controlling primary and secondary excitation frequencies so that ratio between said frequencies is at a predetermined value and sum of said frequency is equal to angular frequency of rotating electrical angle of said motor.

2. A control system for an a.c. motor according to claim 1, wherein said phase sequences determining means is adapted to set the phase sequences for said primary and secondary windings in opposite phase relation in dependence on said position signal.

3. A control system for an a.c. motor according to claim 1, wherein said phase sequence determining means is adapted to reverse the sequence of connection between said primary winding and said first frequency converter and connection between said secondary winding and said secondary frequency converter.

4. A control system for an a.c. motor according to claim 1, wherein said frequency control means is adapted to cause the angular frequency of said position signal to be equal to the angular frequency of said rotating electric angle of rotor multiplied by an integer.

5. A control system for an a.c. motor according to claim 1, wherein said current circuit is adapted to control the primary current supplied to said primary winding so that said primary current is in phase with a position signal having a frequency corresponding to the frequency of said position signal multiplied by an integer and has a magnitude proportional to said current reference signal.

6. A control system for an a.c. motor according to claim 1, wherein said frequency control means comprises a position detector adapted to produce a position signal having a frequency equal to the angular frequency of rotating electrical angle of the motor, an oscillator adapted to be oscillated at a frequency lower than the frequency of said rotating electrical angle and determine the frequency of the alternating current supplied to said secondary winding on the basis of said oscillating frequency, and a frequency setting circuit for determining the frequency of the alternating current supplied to said primary winding in dependence on difference between frequency of just above mentioned position signal and said oscillating frequency.

* * * * *